United States Patent
Nagasawa et al.

(10) Patent No.: US 10,647,254 B2
(45) Date of Patent: May 12, 2020

(54) DISPLAY DEVICE FOR VEHICLE

(71) Applicant: SUBARU CORPORATION, Tokyo (JP)

(72) Inventors: Isamu Nagasawa, Tokyo (JP); Toshiya Furukawa, Tokyo (JP); Tsukasa Mikuni, Tokyo (JP); Takahiro Sakaguchi, Tokyo (JP); Shun Ichikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/642,170

(22) Filed: Jul. 5, 2017

(65) Prior Publication Data
US 2018/0056866 A1    Mar. 1, 2018

(30) Foreign Application Priority Data

Aug. 25, 2016 (JP) ................................ 2016-164555

(51) Int. Cl.
*G06T 3/40* (2006.01)
*B60Q 9/00* (2006.01)
(Continued)

(52) U.S. Cl.
CPC ............. *B60Q 9/008* (2013.01); *B60K 35/00* (2013.01); *B60R 1/00* (2013.01); *G06T 3/20* (2013.01);
(Continued)

(58) Field of Classification Search
CPC .............................................. G08G 1/16–168
See application file for complete search history.

(56) References Cited

U.S. PATENT DOCUMENTS 6,977,630 B1 * 12/2005 Donath ..................... B60R 1/00
345/7
9,875,562 B2 * 1/2018 Hayasaka ............... G06T 11/60
(Continued)

FOREIGN PATENT DOCUMENTS

CN         104554105 A      4/2015
JP         2002-029346 A    1/2002
(Continued)

OTHER PUBLICATIONS

Japanese Office Action dated Jan. 23, 2018 in Japanese Application No. 2016-164555 With an English translation thereof.
(Continued)

*Primary Examiner* — Phong X Nguyen
(74) *Attorney, Agent, or Firm* — McGinn I.P. Law Group, PLLC.

(57) ABSTRACT

A display device for a vehicle includes a collision predictor, a display member, and a display controller. The collision predictor detects a moving body sideward of a course of the vehicle and predicts collision of the vehicle with the moving body detected. The display member provides display of an image or display of a mark, for view of a driver seated on a driver's seat of the vehicle. The image or the mark corresponds to the moving body. The display controller performs a control of the display member. The display controller changes the display of the image or the display of the mark more significantly than a motion of the moving body as actually seen from the driver's seat, on a condition that the collision predictor predicts the collision.

12 Claims, 11 Drawing Sheets

(51) Int. Cl.
*B60R 1/00* (2006.01)
*B60K 35/00* (2006.01)
*G06T 3/20* (2006.01)
*G08G 1/16* (2006.01)

(52) U.S. Cl.
CPC ............. *G06T 3/40* (2013.01); *G08G 1/166* (2013.01); *B60K 2370/1523* (2019.05); *B60K 2370/176* (2019.05); *B60K 2370/178* (2019.05); *B60K 2370/21* (2019.05); *B60K 2370/788* (2019.05); *B60R 2300/307* (2013.01); *B60R 2300/8093* (2013.01)

(56) References Cited

U.S. PATENT DOCUMENTS

| | | | |
|---|---|---|---|
| 2003/0025597 A1* | 2/2003 | Schofield | G06K 9/00798 340/435 |
| 2010/0020169 A1* | 1/2010 | Jang | G01C 21/36 348/115 |
| 2010/0123778 A1* | 5/2010 | Hada | B60R 1/00 348/148 |
| 2010/0253596 A1* | 10/2010 | Szczerba | G01S 13/867 345/7 |
| 2011/0128139 A1* | 6/2011 | Tauchi | B60K 35/00 340/439 |
| 2013/0321628 A1* | 12/2013 | Eng | B60R 1/00 348/148 |
| 2014/0226015 A1* | 8/2014 | Takatsudo | B60R 1/00 348/148 |
| 2014/0240351 A1* | 8/2014 | Scavezze | G06F 3/011 345/633 |
| 2015/0070157 A1* | 3/2015 | Murayama | B60K 35/00 340/435 |
| 2015/0070158 A1* | 3/2015 | Hayasaka | G01S 7/04 340/438 |
| 2015/0183373 A1* | 7/2015 | Hayasaka | G08G 1/166 345/660 |
| 2015/0243171 A1* | 8/2015 | Emura | G06T 11/60 340/435 |
| 2015/0336579 A1* | 11/2015 | Yoshizawa | B60W 30/0956 701/70 |
| 2015/0339534 A1 | 11/2015 | Morikawa et al. | |
| 2016/0144785 A1* | 5/2016 | Shimizu | B60R 11/02 340/435 |
| 2016/0379497 A1* | 12/2016 | Hatakeyama | G08G 1/16 340/435 |
| 2017/0069212 A1* | 3/2017 | Miyazawa | B60K 35/00 |
| 2017/0210293 A1* | 7/2017 | Sugama | G06T 7/246 |
| 2017/0327110 A1* | 11/2017 | Inoue | B60W 10/18 |
| 2017/0349098 A1* | 12/2017 | Uhm | B60K 28/02 |
| 2018/0058879 A1* | 3/2018 | Tayama | G09B 29/00 |

FOREIGN PATENT DOCUMENTS

| | | |
|---|---|---|
| JP | 2005-182305 A | 7/2005 |
| JP | 2007-263839 A | 10/2007 |
| JP | 2012-58999 A | 3/2012 |
| JP | 2013-097480 A | 5/2013 |
| JP | 2015-219803 A | 12/2015 |

OTHER PUBLICATIONS

Chinese Office Action dated Feb. 11, 2019 in Chinese Application No. 201710556022.X and partial English Translation thereof.

* cited by examiner

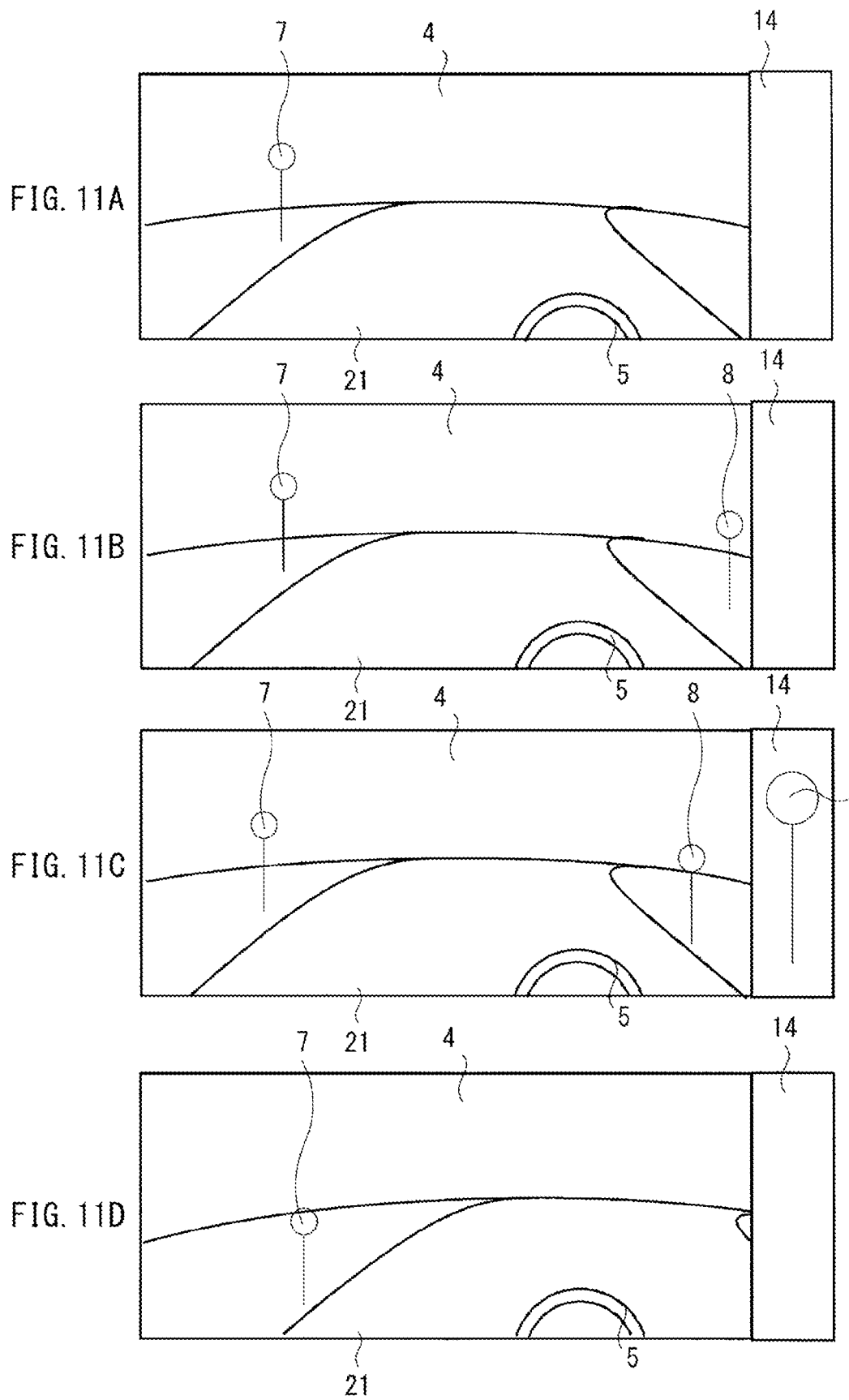

DISPLAY DEVICE FOR VEHICLE

CROSS-REFERENCE TO RELATED APPLICATIONS

The present application claims priority from Japanese Patent Application No. 2016-164555 filed on Aug. 25, 2016, the entire contents of which are hereby incorporated by reference.

BACKGROUND

The technology relates to a display device for a vehicle.

In a vehicle such as an automobile, a driver is seated on a driver's seat in a passenger room, and operates a steering wheel, an accelerator pedal, or a brake pedal, or other equipment, to drive the vehicle.

For purposes of reduction in a burden on the driver, the vehicle provides display of route guidance on a liquid crystal display, or adopts a drive assistance system, as described in Japanese Unexamined Patent Application Publication (JP-A) No. 2007-263839.

SUMMARY

However, safety of the travel of the vehicle basically depends on carefulness and an evasive action of the driver who drives the vehicle.

Accordingly, the driver is requested to check by themselves in a traveling direction of the vehicle during the travel, to sense possibility of collision with another vehicle or a person, and to take a necessary evasive action, even if automatic operation is being performed.

Now, for example, the driver easily recognizes a motion of a person or other incidents on opposite side to the driver's seat, i.e., on navigator's-seat side, of a course of the vehicle. Therefore, the driver can easily take the necessary evasive action in response to the motion. In contrast, it is difficult to recognize the motion of the person on driver's-seat side of the course of the vehicle. This results in a tendency towards a delay in taking the evasive action in response to the motion of the person on the driver's-seat side, as compared to the evasive action in response to the motion of the person on the navigator's-seat side of the course of the vehicle.

There may be some possible reasons such as an offset layout of the driver's seat in the vehicle, and regulation of right-hand traffic or left-hand traffic on a roadway. One plausible reason may be as follows. The driver can easily recognize the motion of the person on the navigator's-seat side that is angled from the driver's seat, as a movement in an oblique front direction. But the person on the driver's-seat side that is non-angled from the driver's seat appears as if they were stopped in a front direction even if they are moving. In particular, in a case where the person is slowly moving on the driver's-seat side of the course, the person appears to be substantially stopped, as seen from the driver's seat. The driver sees the person moving in their sight, but the driver fails in sensing an uncertain movement of the person. Accordingly, the driver fails in sensing the movement of the person who slowly comes into the course from the driver's-seat side of the course. The driver ends up in sensing the movement after the person actually appears on the course, and taking the evasive action. This results in the delay in the evasive action.

It is to be noted that there is a similar disadvantage as to a case of the opposite side to the driver's seat, even though the delay is not as much as the case of the driver's-seat side.

As described, in the vehicle, it is requested to give warning for prompt recognition of uncertainties of a moving body that is moving sideward of the course.

An aspect of the technology provides a display device for a vehicle. The display device includes a collision predictor, a display member, and a display controller. The collision predictor is configured to detect a moving body sideward of a course of the vehicle and predict collision of the vehicle with the moving body detected. The display member is configured to provide display of an image or display of a mark, for view of a driver seated on a driver's seat of the vehicle. The image or the mark corresponds to the moving body. The display controller is configured to perform a control of the display member. The display controller changes the display of the image or the display of the mark more significantly than a motion of the moving body as actually seen from the driver's seat, on a condition that the collision predictor predicts the collision.

The display controller may change the display of the image or the display of the mark on the display member, with a faster movement than the motion of the moving body as actually seen from the driver's seat. The motion of the moving body may include crossing the course.

The display controller may change the display of the image or the display of the mark on the display member, with a faster movement than the motion of the moving body as actually seen from the driver's seat. The motion of the moving body may include approaching the vehicle.

The display controller may allow an amount of the change in the display of the image or an amount of the change in the display of the mark to differ between a first case and a second case. The first case may be a case where the moving body relevant to the image or the mark is positioned sideward of the course on side on which the driver's seat is disposed. The second case may be a case where the moving body relevant to the image or the mark is positioned sideward of the course on opposite side to the driver's seat.

The display controller may allow an amount of the change in the display of the image or an amount of the change in the display of the mark in a first case to be larger than an amount of the change in the display of the image or an amount of the change in the display of the mark in a second case. The first case may be a case where the moving body relevant to the image or the mark is positioned sideward of the course on side on which the driver's seat is disposed. The second case may be a case where the moving body relevant to the image or the mark is positioned sideward of the course on opposite side to the driver's seat.

The display controller may allow an amount of the change in the display of the image or an amount of the change in the display of the mark to differ between a first period and a second period. The first period may be a period immediately after a start of the display. The second period may be a period after the first period.

The display controller may allow an amount of the change in the display of the image or an amount of the change in the display of the mark in a first period to be larger than an amount of the change in the display of the image or an amount of the change in the display of the mark in a second period. The first period may be a period immediately after a start of the display. The second period may be a period after the first period.

The display member may be provided in superposed relation to a front pillar on the side on which the driver's seat is disposed. The display controller may start the display of the image or the display of the mark, on a condition that the collision predictor predicts the collision of the vehicle with the moving body on the side on which the driver's seat is disposed.

BRIEF DESCRIPTION OF THE DRAWINGS

FIGS. 11A to 11D illustrate one example of exaggerated display by the display control according to the fifth implementation.

DETAILED DESCRIPTION

In the following, some implementations of the technology are described with reference to the drawings. The implementations describe cases where a driver's seat is provided on the right side in a vehicle compartment, in a traffic system whereby vehicles move on the left side of a road.

First Implementation

Figure 1:
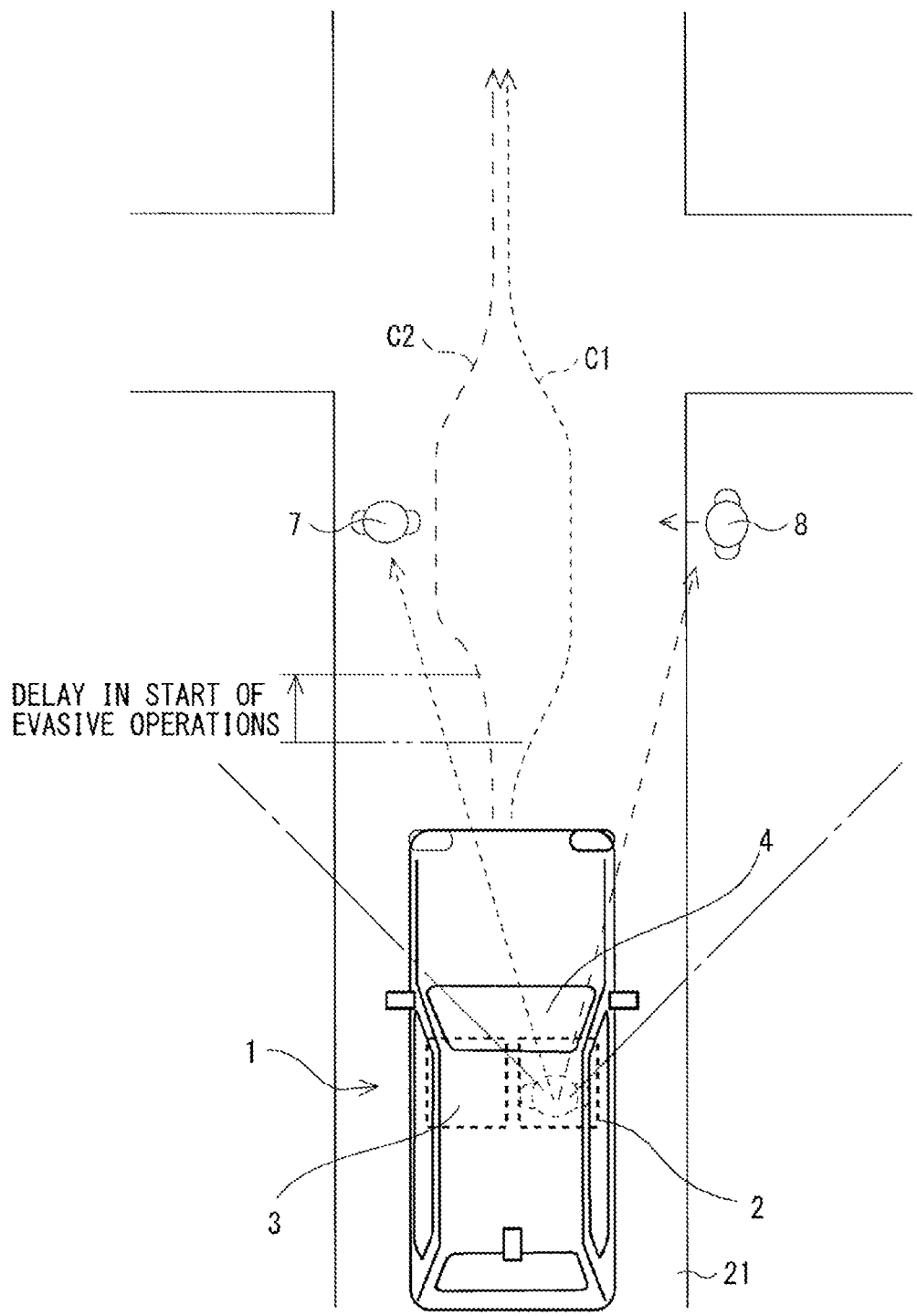
FIG. 1 illustrates one example of an automobile according to a first implementation of the technology, and its traveling environment.

FIG. 1 illustrates an automobile 1 according to a first implementation of the technology, and its traveling environment. FIG. 1 gives an example of a case of left-hand traffic.

The automobile 1 may serve as one example of a vehicle according to an implementation of the technology. In the example in FIG. 1, the automobile 1 may be traveling on a road 21 having a small width, from below upwards in the figure. A driver's seat 2 of the automobile 1 may be offset rightward in the automobile 1. A navigator's seat 3 may be disposed on left side of the driver's seat 2.

A driver may be seated on the driver's seat 2, and check frontward in a traveling direction, through a front windshield 4, with a visual field denoted by an alternate dot and dash line in the figure. The driver is expected to catch sight of a moving body such as a pedestrian, to determine possibility of collision on the basis of a motion of the moving body, and to take a necessary evasive action, by themselves.

For example, let us assume that a person 7 is walking on left side of a course on the road 21 on which the automobile 1 is traveling. In this case, the driver can recognize a movement of the person 7 as a movement obliquely left frontward. In a case where the driver senses the possibility of the collision on the basis of the motion of the person 7, the driver may turn the steering wheel 5 to right to avoid the collision. In FIG. 1, an evasive course is denoted by a fine broken line C1.

As another example, let us assume that a person 8 is going to step down to the road 21 from the right side of the course on the road 21 on which the automobile 1 is traveling. In this case, the driver can recognize the movement of the person 8 as a movement obliquely right frontward. In the case where the driver senses the possibility of the collision on the basis of the motion of the person 8, the driver may turn the steering wheel 5 to left to avoid the collision. In FIG. 1, the evasive course is denoted by a rough broken line C2.

In the following, the term "on the left side of the course" is also referred to as "on navigator's-seat-3 side", i.e., on side on which the navigator's seat 3 is disposed. The term "on the right side of the course" is also referred to as "on driver's-seat-2 side", i.e., on side on which the driver's seat 2 is disposed.

It is easy for the driver to recognize the movement of the moving body or other incidents on the navigator's-seat-3 side of the course of the automobile 1. However, it is difficult for the driver to recognize the movement of the moving body on the driver's-seat-2 side of the course of the automobile 1. This results in a tendency towards a delay in the evasive action in response to the movement of the moving body on the driver's-seat-2 side of the course of the automobile 1. As illustrated in FIG. 1, a point of a start of evasion of the evasive course denoted by the rough broken line C2 is positioned frontward of a point of a start of evasion of the evasive course denoted by the fine broken line C1.

There may be some possible reasons such as the offset layout of the driver's seat 2 in the automobile 1, and regulation of right-hand traffic or the left-hand traffic on a roadway. In this case, the driver can easily recognize the motion of the person 7 on the navigator's-seat-3 side that is angled from the driver's seat 2, as a movement in an oblique front direction. But the person 8 on the driver's-seat-2 side that is non-angled from the driver's seat 2 appears as if they were stopped in a front direction even if they are moving. In particular, in a case where the person 8 is slowly moving on the driver's-seat-2 side of the course, the person 8 appears to be substantially stopped, as seen from the driver's seat 2. The driver sees the person 8 moving in their sight, but the driver fails in sensing an uncertain movement of the person 8. Accordingly, the driver fails in sensing the movement of the person 8 who slowly comes into the course from the driver's-seat-2 side of the course. The driver ends up in sensing the movement after the person 8 actually appears on the course, and taking the evasive action. This results in the delay in the start of the evasive action.

This implementation is intended for early recognition of the moving body on the driver's-seat-2 side of the course.

Figure 2:
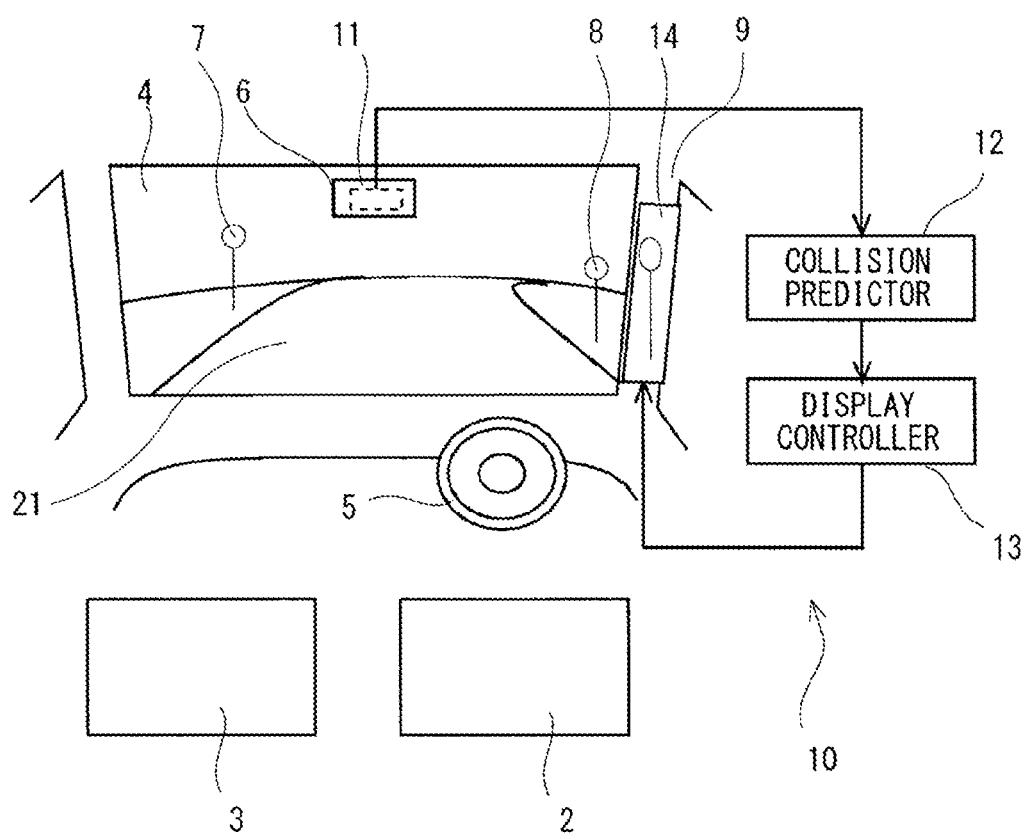
FIG. 2 illustrates a display device according to the first implementation.

FIG. 2 illustrates a display device 10 according to this implementation. The display device 10 may be mounted on the automobile 1.

Referring to FIG. 2, the display device 10 for the automobile 1 may include a detection member 11, a collision predictor 12, a display controller 13, and a display member 14. The collision predictor 12 and the display controller 13 may each include, for example, a microcomputer.

The display member 14 may be, for example but not limited to, a liquid crystal display device. The display member 14 may be provided on a front pillar 9 on the driver's-seat-2 side, in confronted relation to the driver's seat 2. This makes it possible for the display member 14 to display an image for view of the driver seated on the driver's seat 2.

The detection member 11 may be, for example but not limited to, a semiconductor imaging device. The detection member 11 may be disposed in a frontward-directed orientation, for example, on front side of the rear-view mirror 6, in a passenger room of the automobile 1. This makes it possible for the detection member 11 to capture images in the traveling direction including sideward of the course of the automobile 1. The detection member 11 may output the images thus captured to the collision predictor 12.

The collision predictor 12 detects, on the basis of the images captured by the detection member 11, a moving body on one side of the course of the automobile 1, i.e., on the driver's-seat-2 side, and predicts possibility of collision of the automobile 1 with the moving body.

In order to detect a movement of the moving body, the collision predictor 12 may superimpose a plurality of the images that are temporarily successively captured, with their backgrounds superposed on one another, and detect the moving body as differences between the plurality of the images thus superposed on one another. Moreover, the collision predictor 12 may calculate a relative direction and a relative distance of the moving body with reference to the automobile 1, on the basis of positions of the moving body detected in the images. For example, in a case where the images of an identical range are captured by a pair of the semiconductor imaging devices arranged side by side in a right-and-left direction on the front side of the rear-view mirror 6, it is possible to calculate the relative direction and the relative distance of the moving body, by triangulation, on the basis of differences of the positions of the moving body captured in the images. This makes it possible to detect presence or absence of the moving body on the driver's-seat-2 side of the course of the automobile 1. It is also possible, if the presence of the moving body is detected, to detect presence or absence of the movement of the moving body.

In order to predict the collision with the moving body, the collision predictor 12 may calculate the presence or the absence of the movement of the moving body, a direction of the movement, and a speed of the movement, on the basis of changes in the relative direction and the relative distance of the identical moving body that is temporarily successively detected. Moreover, the collision predictor 12 may predict the possibility of the collision, on the basis of a movement of the automobile 1 and the movement of the moving body. For example, the collision predictor 12 may determine whether or not a predicted path of the movement of the moving body is going to cross a predicted path of the movement of the automobile 1. Furthermore, in a case where the predicted paths are going to cross each other, the collision predictor 12 may calculate a time zone when the moving body passes through a position at which the predicted paths are going to cross, and calculate a time zone when the automobile 1 passes through the position at which the predicted paths are going to cross. In a case with overlap between the time zones, the collision predictor 12 may determine presence of the possibility of the collision.

The display controller 13 may be coupled to the collision predictor 12. The display controller 13 may allow, on the basis of information generated by the collision predictor 12, the display member 14 to display the moving body with which the collision has been predicted.

Figure 3:
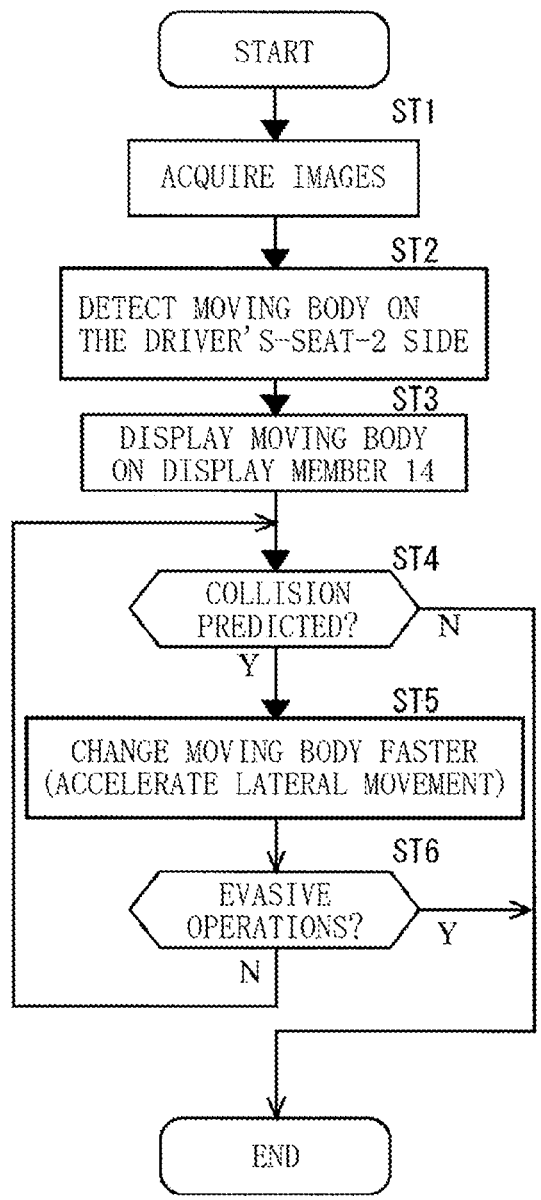
FIG. 3 is a flowchart of a warning display control by the display device illustrated in FIG. 2.

FIG. 3 is a flowchart of a warning display control by the display device 10 illustrated in FIG. 2.

The display device 10 illustrated in FIG. 2 may repetitively execute the warning display control illustrated in FIG. 3, during travel of the automobile 1.

In the warning display control illustrated in FIG. 3, first, the collision predictor 12 may acquire latest images from the detection member 11 (step ST1).

The collision predictor 12 detects, on the basis of the images captured, the moving body on one side of the course of the automobile 1, i.e., on the driver's-seat-2 side (step ST2).

It is to be noted that in a case with absence of the moving body on the driver's-seat-2 side, the display device 10 may stop processing illustrated in FIG. 3.

Thereafter, the display controller 13 may allow the display member 14 to display an image corresponding to the moving body detected by the collision predictor 12 (step ST3).

The display controller 13 may extract a partial image of the captured moving body from any one of the images captured by the detection member 11, to allow the display member 14 to display the partial image as the image corresponding to the moving body.

In one alternative, the display controller 13 may allow the display member 14 to display a predetermined mark, instead of the partial image of the captured moving body. The predetermined mark may be provided in advance in accordance with, for example but not limited to, kinds or categories of the moving body.

Thereafter, the collision predictor 12 predicts the possibility of the collision of the automobile 1 with the moving body (step ST4).

For example, the collision predictor 12 may acquire a locus of the moving body, on the basis of positional changes and distances of the moving body in the images. In a case with overlap between a time zone when the moving body passes through a range in which the locus of the moving body crosses a locus of the automobile 1 and a time zone when the automobile 1 passes through the relevant range, the display controller 13 may determine the presence of the possibility of the collision of the automobile 1 with the moving body (Y in step ST4).

In a case with absence of the moving body with which the collision is predictable (N in step ST4), the display device 10 may end the processing in FIG. 3.

In a case with presence of the moving body with which the collision is predictable (Y in step ST4), the display controller 13 changes the image of the moving body displayed on the display member 14, more significantly than the motion of the moving body as actually seen from the driver's seat 2 (step ST5).

In one specific but non-limiting example, the display controller 13 may change the image of the moving body with which the collision is predictable, with a faster movement than the motion of crossing the course as actually seen from the driver's seat 2.

For example, the display controller 13 may acquire the speed of the movement and the direction of the movement in the captured images, on the basis of the positional changes in the images of the moving body. The display controller 13 may move a display position of the image, in a same direction as the direction of the movement, at a higher speed than the speed of the movement thus acquired.

Thereafter, the display controller 13 may determine whether or not evasive operations have been carried out by the driver (step ST6).

In a case where no evasive operations have been carried out (N in step ST6), the flow may return to the step ST4, where the display of the moving body with which the collision is predictable is repeated.

In a case where the evasive operations have been carried out (Y in step ST6), the display device 10 may end the processing in FIG. 3.

As described, the moving body on the driver's-seat-2 side of the course of the automobile 1 may be displayed in superposed relation to the front pillar 9 on the driver's-seat-2 side. This makes it possible for the driver to recognize the moving body.

Moreover, in the case with the presence of the possibility of the collision of the automobile 1 with the moving body, the display position of the image of the moving body may be changed with the faster movement than the motion of the moving body as actually seen. This makes it possible for the driver to reflexively take the evasive action.

FIGS. 4A to 4D illustrate one example of exaggerated display by the display control in FIG. 3.

Figure 4:
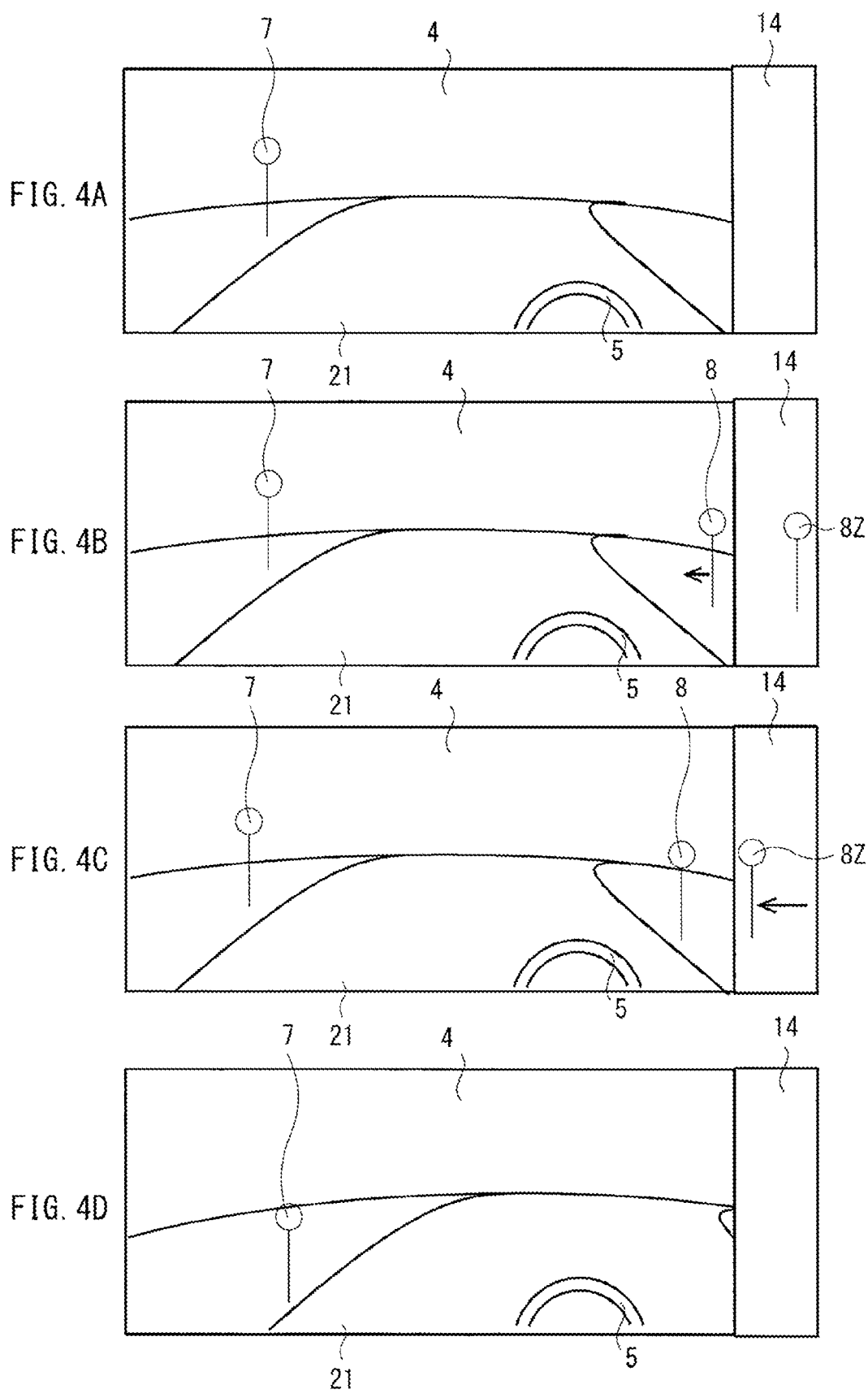
FIGS. 4A to 4D illustrate one example of exaggerated display by the warning display control in FIG. 3.

In FIG. 4A, in a region corresponding to the driver's visual field through the front windshield 4, a pedestrian or the person 7 is seen to be moving along a left road shoulder on opposite side to the driver's seat 2. Here, the driver's-seat-2 side refers to the right side. In this case, because there are no moving bodies on the driver's-seat-2 side of the course of the automobile 1, the collision predictor 12 detects no moving bodies, and predicts no possibility of the collision.

As illustrated in FIG. 4B, when the person 8 appears on a road shoulder on the driver's-seat-2 side, the collision predictor 12 detects the person 8 as the moving body and predicts the possibility of the collision. Moreover, the display controller 13 may allow the display member 14 to display the image 8Z of the moving body. The display member 14 may be provided in superposed relation to the front pillar 9 on the driver's-seat-2 side.

Thereafter, as illustrated in FIG. 4C, when the person 8 who has appeared on the road shoulder on the driver's-seat-2 side starts to move, for example, in a direction of crossing the course of the automobile 1, the collision predictor 12 predicts the presence of the possibility of the collision of the automobile 1 with the moving body, i.e., the person 8. The display controller 13 may control the display member 14 to display, with a fast motion, the image 8Z of the moving body that has been displayed on the display member 14. The display member 14 may be provided in the superposed relation to the front pillar 9 on the driver's-seat-2 side.

With the display as described above, it is possible for the driver to recognize the presence of the possibility of the collision of the automobile 1 with the pedestrian, i.e., the person 8 on the road shoulder on the driver's-seat-2 side, and to take the collision-evasive action promptly, reflexively in response to the fast motion.

As a result, as illustrated in FIG. 4D, the driver may turn the steering wheel 5, for example, to the left, causing the course of the automobile 1 to shift leftward. The pedestrian or the person 8 with whom the collision has been predictable comes out of the course. Thus, the collision is avoided. The display controller 13 may stop the display of the image 8Z of the pedestrian, i.e., the person 8 on the display member 14.

In this implementation, the display member 14 is allowed to display the image 8Z corresponding to the moving body on one side of the course of the automobile 1, i.e., on the driver's-seat-2 side. The display member 14 displays the image 8Z for view of the driver seated on the driver's-seat 2 of the automobile 1. Hence, it is possible for the driver who operates the automobile 1 to recognize the presence of the moving body on the driver's-seat-2 side of the course of the automobile 1.

Moreover, in this implementation, in the case where the collision with the moving body is predictable, the display of the image 8Z corresponding to the moving body is changed more significantly than the motion of the moving body as actually seen from the driver's seat 2. Changing the display of the image 8Z corresponding to the moving body in such an exaggerated motion makes it possible to give warning to the driver about the moving body and their motion. It is possible for the driver to take the necessary evasive action promptly. It is possible to urge the reflexive evasive action.

As described, in this implementation, it is possible to give warning for prompt recognition of uncertainties of the moving body that moves on the driver's-seat-2 side of the course of the automobile 1.

Second Implementation

Description is given next of the display device 10 for the automobile 1 according to a second implementation of the technology. In this implementation, similar configurations as those of the first implementation are denoted by the same reference characters as those of the first implementation, and the description thereof is omitted. In the following, description is given mainly of differences from the first implementation.

Figure 5:
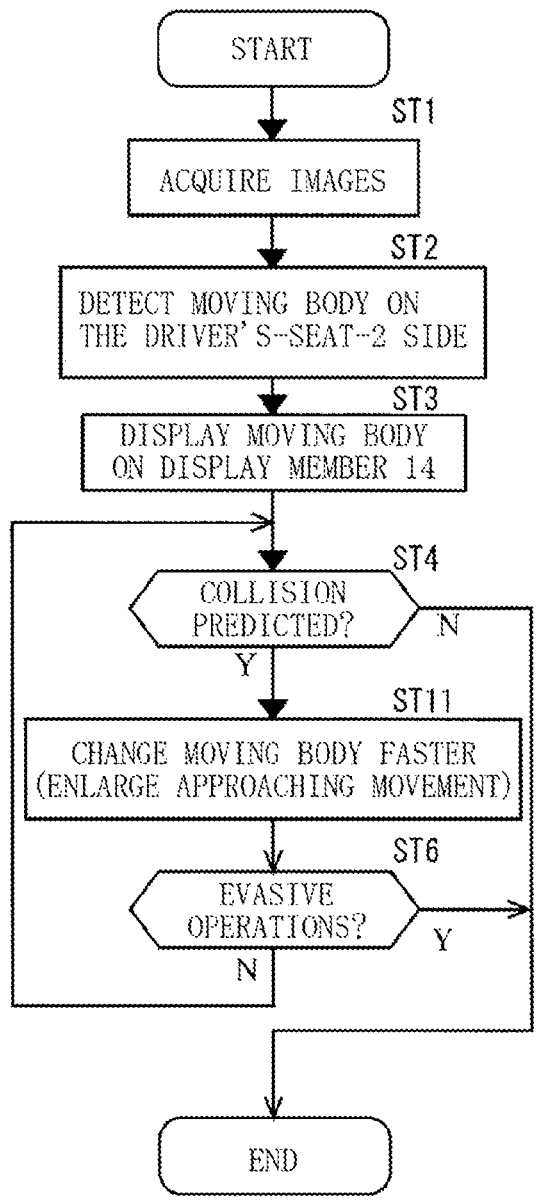
FIG. 5 is a flowchart of a warning display control according to a second implementation of the technology.

FIG. 5 is a flowchart of a warning display control according to this implementation.

In step ST4, in the case with the presence of the moving body or the person 8 with which the collision is predictable (Y in step ST4), the display controller 13 changes the image 8Z of the moving body displayed on the display member 14, more significantly than the motion of the moving body, i.e., the person 8 as actually seen from the driver's seat 2 (step ST11).

In one specific but non-limiting example, the display controller 13 may change the image 8Z of the moving body with which the collision is predictable, with the faster movement than the motion of crossing the course, or the motion of approaching the automobile 1, as actually seen from the driver's seat 2.

For example, the display controller 13 may obtain a speed of the motion of approaching the automobile 1 in the captured images, on the basis of changes in size of the moving body in the images. The display controller 13 may change a display size of the image 8Z, with the faster movement in the same direction than the speed thus obtained.

Thereafter, the display controller 13 may determine whether or not the collision-evasive operations have been carried out by the driver (step ST6).

FIGS. 6A to 6D illustrate one example of the exaggerated display by the display control illustrated in FIG. 5.

Figure 6:
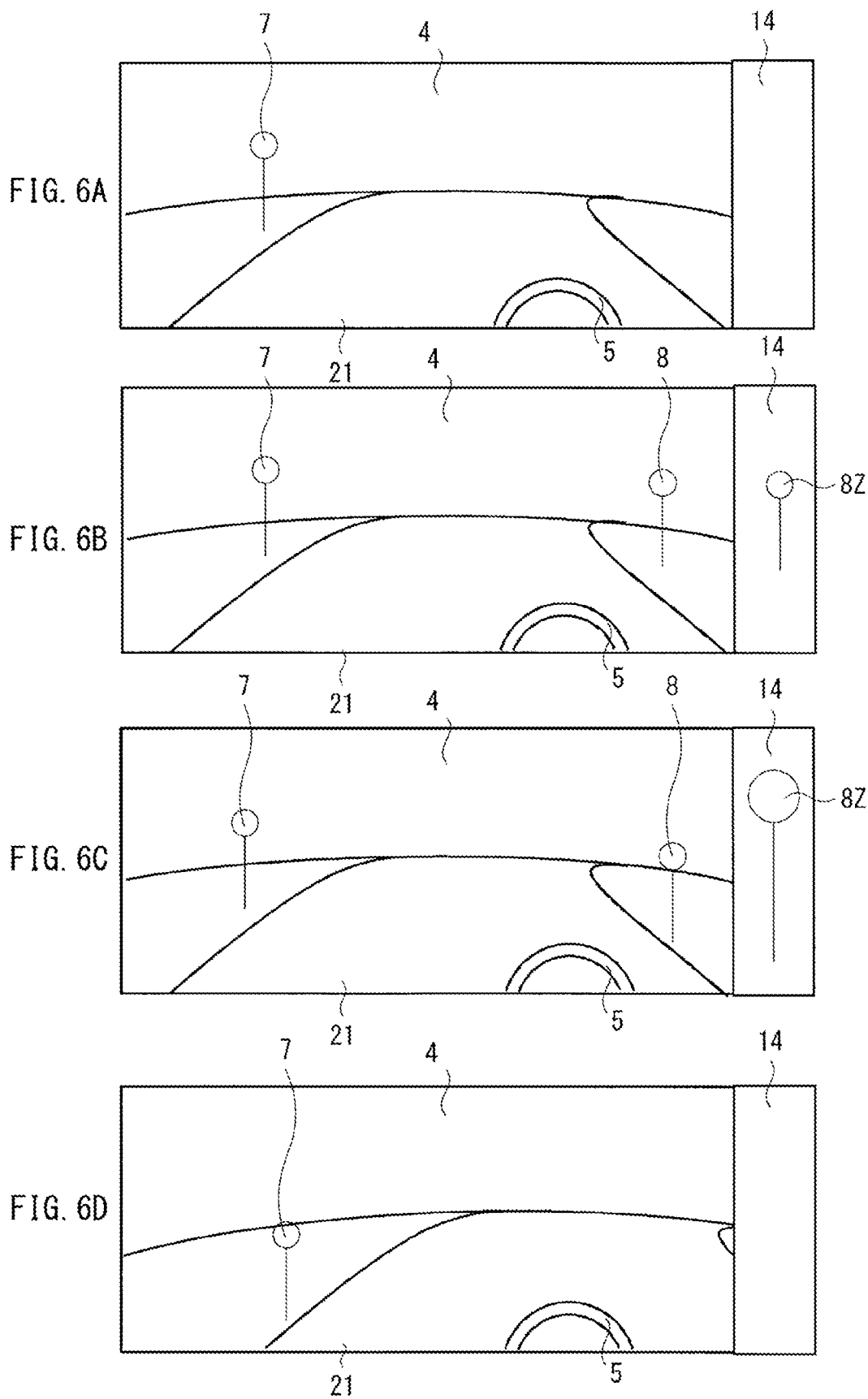
FIGS. 6A to 6D illustrate one example of exaggerated display by the warning display control in FIG. 5.

As illustrated in FIG. 6B, when the person 8 appears on the road shoulder on the driver's-seat-2 side, the collision predictor 12 detects the person 8 as the moving body and predicts the possibility of the collision of the automobile 1 with the moving body. Moreover, the display controller 13 may allow the display member 14 to display the image 8Z of the moving body. The display member 14 may be provided in the superposed relation to the front pillar 9 on the driver's-seat-2 side.

Thereafter, as illustrated in FIG. 6C, when the person 8 who has appeared on the road shoulder on the driver's-seat-2 side starts to move, for example, toward the automobile 1, the collision predictor 12 predicts the presence of the possibility of the collision with the person 8 as the moving body. The display controller 13 may display, in the fast motion, the image 8Z of the moving body displayed in the superposed relation to the front pillar 9 on the driver's-seat-2 side. In one specific but non-limiting example, the display controller 13 may enlarge the size of the image 8Z to a larger size than a size actually seen.

With the display as described above, it is possible for the driver to recognize the possibility of the collision with the pedestrian, i.e., the person 8 on the road shoulder on the driver's-seat-2 side, and to take the collision-evasive action promptly, reflexively in response to the fast motion.

As a result, as illustrated in FIG. 6D, the driver may turn the steering wheel 5, for example, to the left, causing the course of the automobile 1 to shift leftward. The pedestrian or the person 8 with whom the collision has been predictable comes out of the course. Thus, the automobile 1 successfully avoids the collision with the person 8. The display controller 13 may stop the display of the image 8Z of the pedestrian, i.e., the person 8 on the display member 14.

In FIG. 6C, the pedestrian or the person 8 is displayed in the larger size than the actual size, whereas in FIG. 6B, the pedestrian or the person 8 is displayed in the size actually seen. This causes the driver to have a sensation as if the pedestrian or the person 8 were rapidly approaching, although the pedestrian or the person 8 barely approaches in reality. With the display of the image 8Z of the pedestrian or the person 8 who approaches faster than actually seen, it is possible for the driver to take the collision-evasive action promptly, reflexively in response to the fast motion.

Third Implementation

Description is given next of the display device 10 for the automobile 1 according to a third implementation of the technology. In this implementation, similar configurations as those of the first implementation are denoted by the same reference characters as those of the first implementation, and the description thereof is omitted. In the following, description is given mainly of differences from the first implementation.

Figure 7:
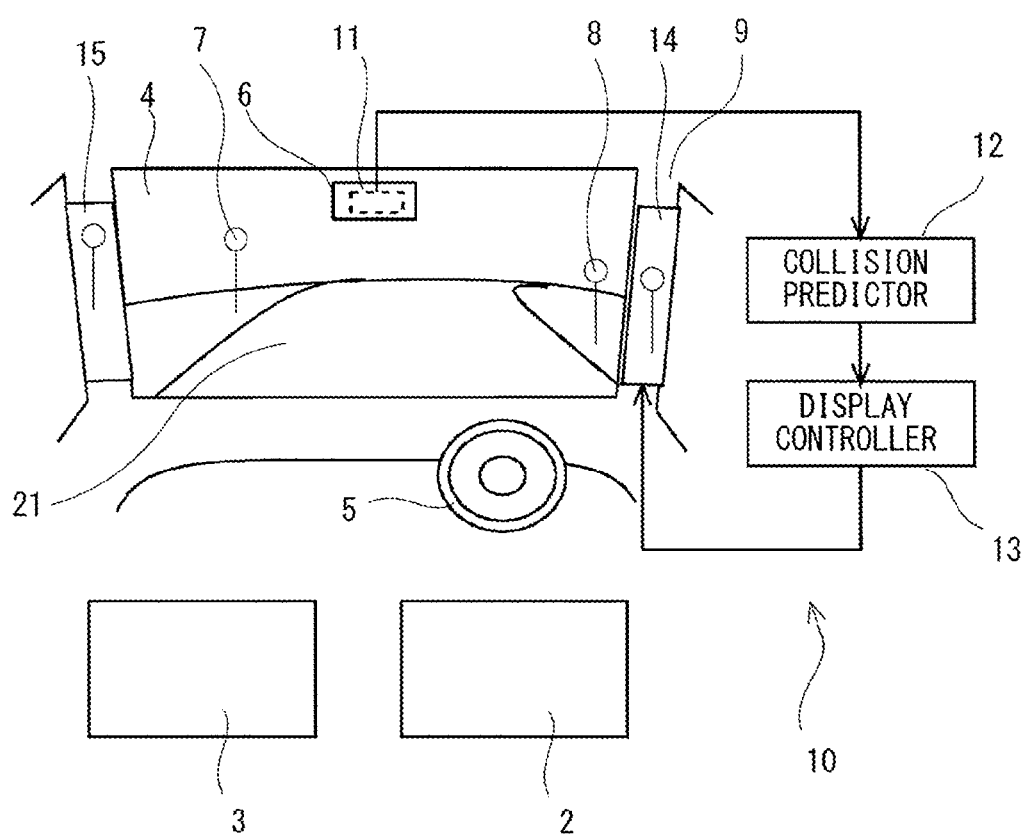
FIG. 7 illustrates a display device according to a third implementation of the technology.

FIG. 7 illustrates the display device 10 according to this implementation.

As illustrated in FIG. 7, the display device 10 for the automobile 1 may include a display member 15 on the navigator's-seat-3 side opposite to the driver's seat 2, in addition to the display member 14 on the driver's-seat-2 side.

The display member 15 on the navigator's-seat-3 side may be a liquid crystal display device, as with the display member 14 on the driver's-seat-2 side. The display member 15 may be provided on a front pillar on the navigator's-seat-3 side, in the confronted relation to the driver's seat 2. This makes it possible for the display member 15 to display the image for view of the driver seated on the driver's seat 2.

The display controller 13 may allow the display members 14 and 15 to display the moving body with which the collision is predictable.

Figure 8:
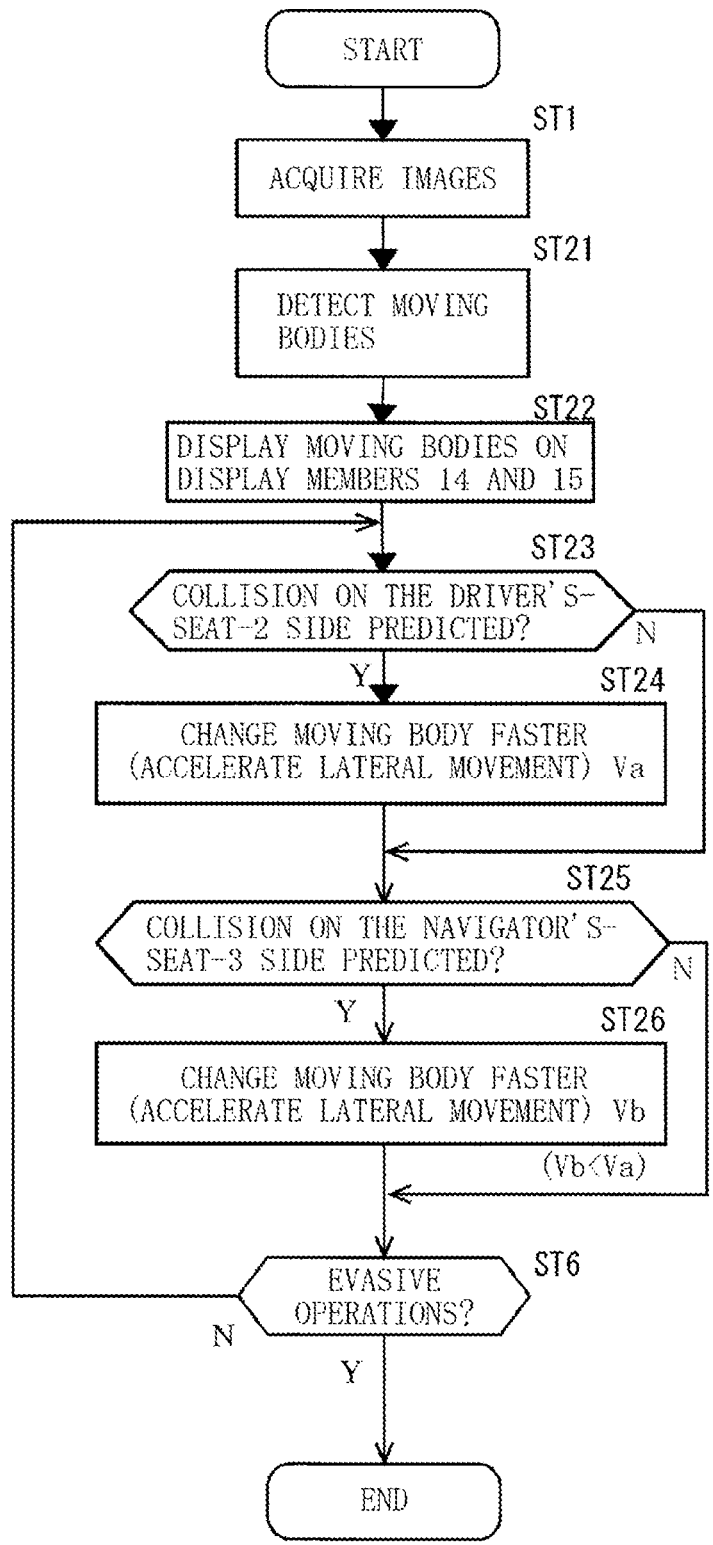
FIG. 8 is a flowchart of a warning display control according to the third implementation.

FIG. 8 is a flowchart of a warning display control according to this implementation.

In the warning display control illustrated in FIG. 8, the collision predictor 12 may acquire the latest images from the detection member 11 (step ST1). The collision predictor 12 detects, on the basis of the images captured, the moving bodies on both sides of the course of the automobile 1 (step ST21).

It is to be noted that in the case with the absence of the moving body on the both sides, the display device 10 may stop the processing illustrated in FIG. 8.

Thereafter, the display controller 13 may allow the display members 14 and 15 to display images corresponding to the moving bodies detected by the collision predictor 12 (step ST22).

At this occasion, the display controller 13 may classify the moving bodies into those on the driver's-seat-2 side and those on the opposite side, i.e., the navigator's-seat-3 side. The display controller 13 may allow the display member 14 on the driver's-seat-2 side to display the images of the moving body on the driver's-seat-2 side. The display controller 13 may allow the display member 15 on the navigator's-seat-3 side to display the images of the moving body on the navigator's-seat-3 side.

Thus, the moving bodies on both the right and left sides of the course may be classified and displayed separately on the display members 14 and 15 on the right and left sides of the course. This makes it possible for the driver to intuitively and accurately understand each of the moving bodies on both the right and left sides and their relative positions to the course.

Thereafter, the collision predictor 12 predicts the possibility of the collision with each of the moving bodies.

First, the collision predictor 12 may predict the possibility of the collision of the automobile 1 with the moving body on the driver's-seat-2 side (step ST23).

In the case with the presence of the moving body on the driver's-seat-2 side with which the collision is predictable (Y in step ST23), the display controller 13 may change the image of the moving body displayed on the display member 14, more significantly than the motion of the moving body as actually seen from the driver's seat 2 (step ST24).

Thereafter, the collision predictor 12 may predict the possibility of the collision with the moving body on the navigator's-seat-3 side (step ST25).

In the case with the presence of the moving body on the navigator's-seat-3 side with which the collision is predictable (Y in step ST25), the display controller 13 may change the image of the moving body displayed on the display member 15, more significantly than the motion of the moving body as actually seen from the driver's seat 2 (step ST26).

At this occasion, an amount Vb of the change in the display position of the moving body on the navigator's-seat-3 side may be smaller than an amount Va of the change in the display position of the moving body on the driver's-seat-2 side. Thus, the amount Va of the change of the moving body on the driver's-seat-2 side is allowed to be larger than the amount Vb of the change of the moving body on the navigator's-seat-3 side. This makes it possible to draw more attention to the moving body on the driver's-seat-2 side than to the moving body on the navigator's-seat-3 side.

Thereafter, the display controller 13 may determine whether or not the collision-evasive operations have been carried out by the driver (step ST6).

Fourth Implementation

Description is given next of the display device 10 for the automobile 1 according to a fourth implementation of the technology. In this implementation, similar configurations as those of the first implementation are denoted by the same reference characters as those of the first implementation, and the description thereof is omitted. In the following, description is given mainly of differences from the first implementation.

Figure 9:
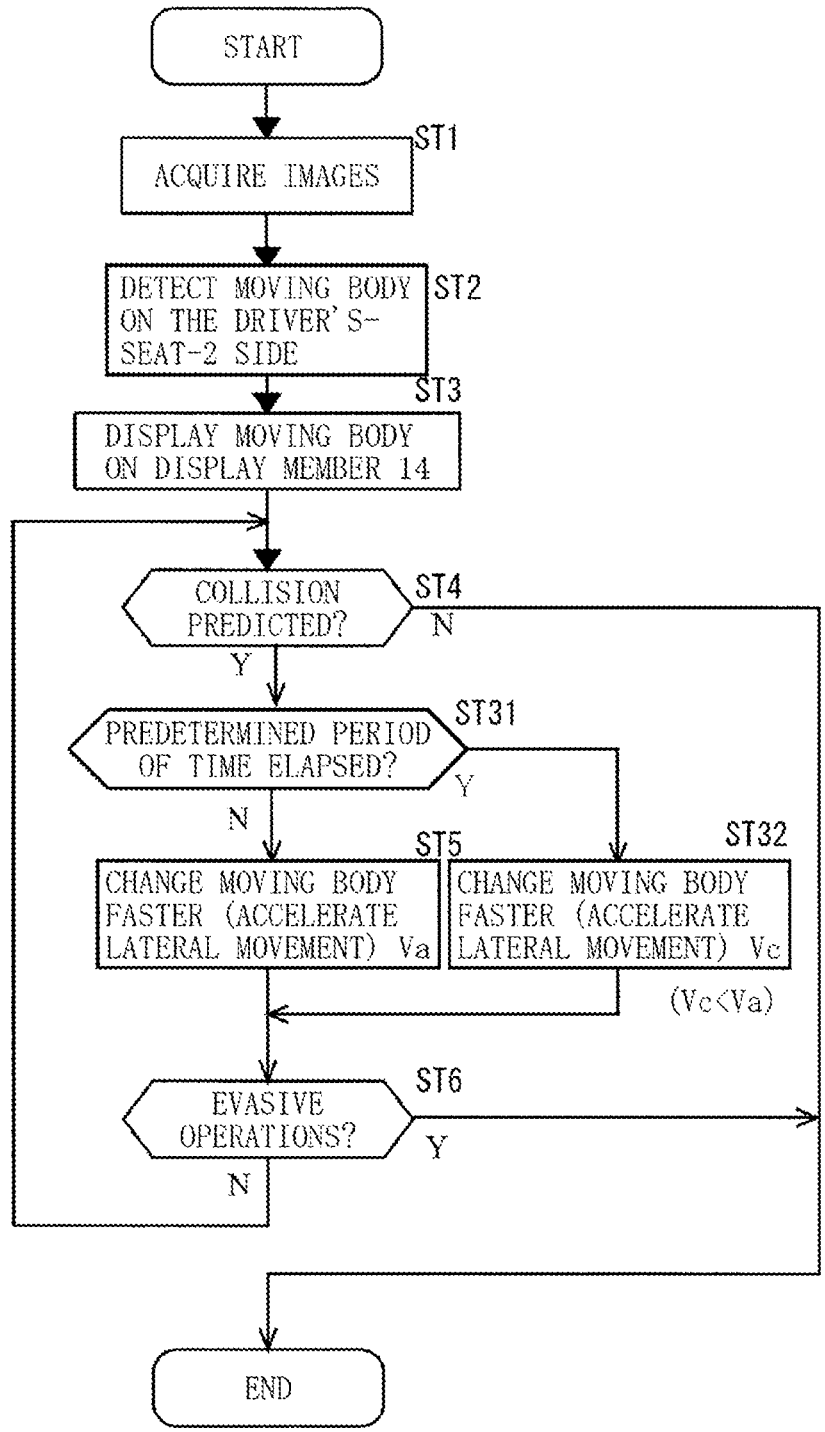
FIG. 9 is a flowchart of a warning display control according to a fourth implementation.

FIG. 9 is a flow chart of a warning display control according to this implementation.

The collision predictor 12 predicts the possibility of the collision of the automobile 1 with the moving body (step ST4). Thereafter, the display controller 13 may determine whether or not elapsed time from the first detection has become equal to or longer than a predetermined period of time (step ST31). The elapsed time may be measured by an undepicted timer.

In a case where the predetermined period of time has not passed, i.e., immediately after a start of the display (N in step ST31), the display controller 13 may change the image of the moving body displayed on the display member 14, more significantly than the motion of the moving body as actually seen from the driver's seat 2 (step ST5).

In contrast, in a case where the predetermined period of time has passed (Y in step ST31), the display controller 13 may change the image of the moving body displayed on the display member 14, more significantly than the motion of the moving body as actually seen from the driver's seat 2 (step ST32).

At this occasion, an amount Vc of the change in the display position after the lapse of the predetermined period may be smaller than an amount Va of the change in the display position before the lapse of the predetermined period. Thus, the moving body that has been on display over the predetermined period may be moved at a lower relative speed. This makes it possible to move the newly-appearing moving body immediately after the start of the display, faster and more significantly, and to call the driver's attention. Even in a case where the images corresponding to the respective moving bodies overlap with one another, a difference in their speeds makes it possible for the driver to recognize presence of a plurality of the moving bodies.

Thereafter, the display controller 13 may determine whether or not the collision-evasive operations have been carried out by the driver (step ST6).

Fifth Implementation

Description is given next of the display device 10 for the automobile 1 according to a fifth implementation of the technology. In this implementation, similar configurations as those of the first implementation are denoted by the same reference characters as those of the first implementation, and the description thereof is omitted. In the following, description is given mainly of differences from the first implementation.

Figure 10:
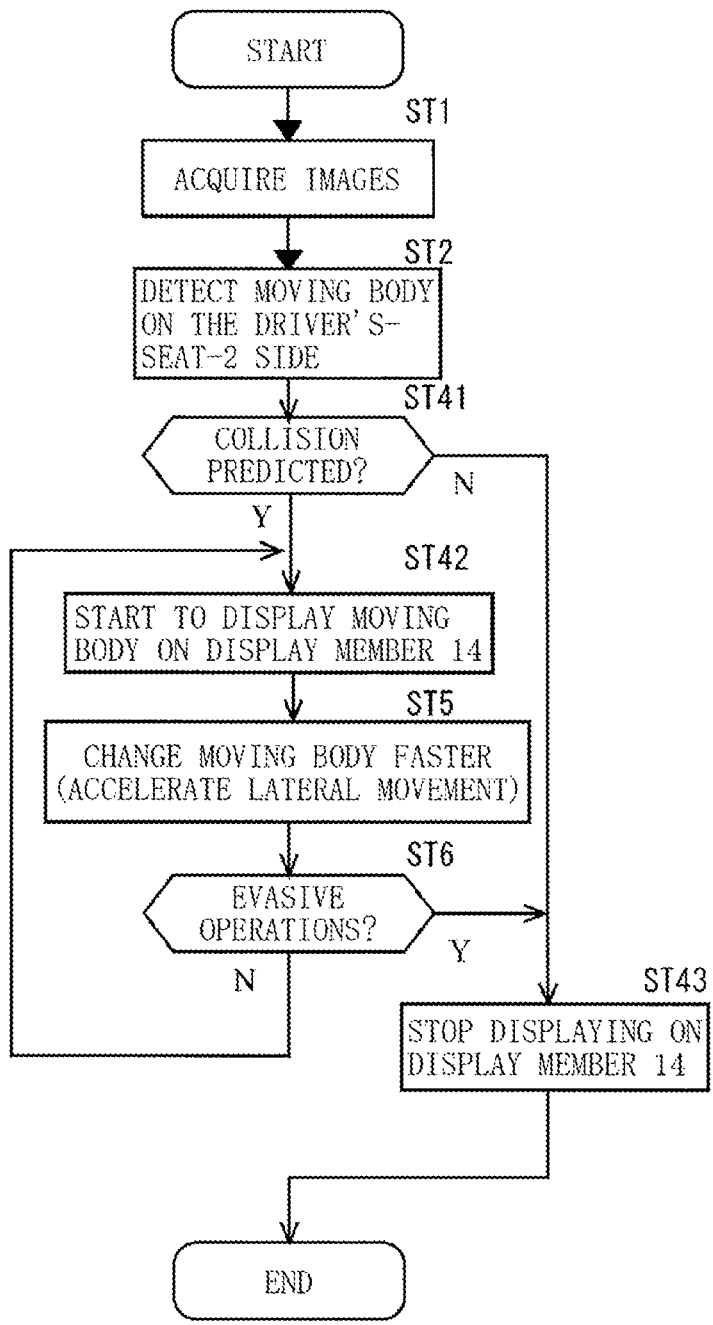
FIG. 10 is a flowchart of a warning display control according to a fifth implementation.

FIG. 10 is a flowchart of a warning display control according to a fifth implementation of the technology.

The display device 10 illustrated in FIG. 2 may repetitively execute the warning display control illustrated in FIG. 10, during the travel of the automobile 1.

In the warning display control illustrated in FIG. 10, the collision predictor 12 may acquire the latest images from the detection member 11 (step ST1), and detect the moving bodies on the driver's-seat-2 side (step ST2).

Thereafter, the collision predictor 12 predicts the possibility of the collision of the automobile 1 with each of the moving bodies (step ST41).

In the case of the absence of the moving body with which the collision is predictable (N in step ST41), the display device 10 may end the processing illustrated in FIG. 10.

In the case of the presence with the moving body with which the collision is predictable (Y in step ST41), the display controller 13 may start to display the image corresponding to the moving body, on the display member 14 (step ST42).

Thereafter, the display controller 13 changes the image of the moving body on display, more significantly than the motion of the moving body as actually seen from the driver's seat 2 (step ST5).

Thereafter, the display controller 13 may determine whether or not the collision-evasive operations have been carried out by the driver (step ST6).

In the case where no evasive operations have been carried out (N in step ST6), the flow may return to step ST42, where the display controller 13 may repeat the display of the image of the moving body with which the collision is predictable.

In the case where the evasive operations have been carried out (Y in step ST6), the display controller 13 may end the display on the display member 14 (step ST43). Thus, the display device 10 may end the processing illustrated in FIG. 10.

As described above, the moving body on the driver's-seat-2 side of the course of the automobile 1 is displayed on the display member 14. The display member 14 may be provided in the superposed relation to the front pillar 9 on the driver's-seat-2 side. Hence, it is possible for the driver to recognize the moving body.

Moreover, the display on the display member 14 may be started, upon the possibility of the collision being predicted. Hence, it is possible for the driver to recognize the moving body easily and to take the evasive action reflexively.

FIGS. 11A to 11D illustrate one example of the exaggerated display by the display control according to this implementation.

The situations of FIGS. 11A to 11D may be similar to those of FIGS. 4A to 4D.

When the presence of the pedestrian is confirmed as illustrated in FIG. 11B, the pedestrian is not displayed on the display member 14 in the superposed relation to the front pillar 9 on the driver's-seat-2 side. The display member 14 provides no display, and may perform, for example, black display.

Thereafter, upon the prediction of the collision as illustrated in FIG. 11C, the image 8Z of the pedestrian, i.e., the person 8 may be displayed on the display member 14 in the superposed relation to the front pillar 9 on the driver's-seat-2 side. The pedestrian or the person 8 suddenly appears on the display member 14 on which nothing has been displayed. This causes the driver to have a sensation as if the pedestrian or the person 8 had appeared all of a sudden, although the pedestrian or the person 8 barely approaches in reality. With the display of the image 8Z of the pedestrian or the person 8 approaching faster than actually seen, it is possible for the driver to take the collision-evasive action promptly, reflexively in response to the sudden display.

Moreover, as illustrated in FIG. 11C, the pedestrian or the person 8 may be displayed as the image that is larger in size than actually seen. This makes it possible for the driver to easily recognize the moving body on display as a pedestrian.

Although some implementations of the technology have been described in the foregoing by way of example with reference to the accompanying drawings, the technology is by no means limited to the implementations described above. It should be appreciated that various modifications and alterations may be made without departing from the scope as defined by the appended claims, and the technology is intended to include such modifications and alterations.

In the forgoing implementations, the image 8Z corresponding to the moving body may be displayed on the display device 10 provided on the front pillar 9 on the driver's-seat-2 side.

The display device 10 may be provided in other places than the front pillar 9 on the driver's-seat-2 side. For example, projection display may be provided on a peripheral part of the front windshield 4, or alternatively, an instrumental panel may serve as the display device 10. In another alternative, a device such as a head mount display may serve as the display device 10.

In one implementation described above, the collision predictor 12 and the display controller 13 illustrated in the figures such as FIGS. 2 and 7 may be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the collision predictor 12 and the display controller 13. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the units illustrated in the figures such as FIGS. 2 and 7.

Although some preferred implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A display device for a vehicle, the display device comprising:
   an imaging device capturing images in a traveling direction of the vehicle;
   a display apparatus providing a display of one or both of an image and a mark that are specified based on images for view of a driver seated on a driver's seat of the vehicle; and
   one or more computers configured to:
   detect, using the images captured by the imaging device, a moving body in a traveling direction of the vehicle, a movement of the moving body, and a speed of the movement of the moving body;
   predict a collision of the vehicle with the moving body based on the movement of the moving body;
   perform, after detecting the moving body, a first control of the display apparatus that causes the display apparatus to display one or both of a first image and a first mark that correspond to the moving body, wherein the first image indicates one or more partial images extracted from the images that are captured by the imaging device, and the first mark corresponds to the first image; and
   perform, responsive to the predicting of the collision of the vehicle with the moving body, a second control of the display apparatus that causes the display apparatus to display one or both of a second image and a second mark changed from the one or both of the first image and the first mark,
   wherein the one or both of the second image and the second mark are displayed in the display apparatus so that, after the predicting of the collision of the vehicle with the moving body, at least one of following conditions is implemented:
   a position of the one or both of the second image and the second mark changes in the display apparatus with a faster speed than the speed of the movement of the moving body as actually seen from the driver; and
   a size of the one or both of the second image and the second mark changes in the display apparatus compared to a size of the one or both of the second image and the second mark as actually seen from the driver,
   wherein the display apparatus includes a first display member that is provided to a first front pillar on a driver's-seat side on which the driver's seat is disposed, and a second display member that is provided to a second front pillar on a navigator's seat side opposite to the driver's-seat side,
   wherein the one or more computers are further configured to:
   classify moving bodies into a moving body on the driver's-seat side and a moving body on the navigator's-seat side;
   display images of the moving body on the driver's-seat side on the first display member; and
   display images of the moving body on the navigator's-seat side on the second display member, and
   wherein the one or both of the second image and the second mark are displayed in the display apparatus so that at least one of following conditions is further implemented:
   an amount where the second image displayed on the second display member is changed is smaller than an amount where the second image displayed on the first display member is changed; and
   an amount where the second mark displayed on the second display member is changed is smaller than an amount where the second mark displayed on the first display member is changed.

2. The display device for the vehicle according to claim 1, wherein the one or both of the second image and the second mark are displayed in the display apparatus so that the one or both of the second image and the second mark change, with a faster movement than a motion of the moving body as actually seen from the driver, the motion of the moving body including crossing the travel direction.

3. The display device for the vehicle according to claim 2, wherein the one or more computers allow one or both of an amount of a change in the display apparatus of the second image and an amount of the change in the display apparatus of the second mark to differ between a first case and a second case, the first case being a case where the moving body relevant to the one or both of the first image and the first mark are positioned on a right side with respect to the driver's seat in the traveling direction, and the second case being a case where the moving body relevant to the one or both of the first image and the first mark are positioned on a left side with respect to the driver's seat in the traveling direction.

4. The display device for the vehicle according to claim 2, wherein one or both of an amount of a change in the display apparatus of the second image and an amount of the change in the display apparatus of the second mark in a first case are larger than an amount of the change in the display apparatus of the second image and an amount of the change in the display apparatus of the second mark in a second case, the first case being a case where the moving body relevant to the one or both of the first image and the first mark are positioned on a driver's seat side on which the driver's seat is disposed, and the second case being a case where the moving body relevant to the one or both of the first image and the first mark are positioned on a navigator's seat side opposite to the driver's-seat side.

5. The display device for the vehicle according to claim 1, wherein the one or both of the second image and the second mark are displayed in the display apparatus so that the one or both of the second image and the second mark change, with a faster movement than a motion of the moving body as actually seen from the driver, the motion of the moving body including approaching the vehicle.

6. The display device for the vehicle according to claim 5, wherein the one or more computers allow one or both of an amount of a change in the display apparatus of the second image and an amount of the change in the display apparatus of the second mark to differ between a first case and a second case, the first case being a case where the moving body relevant to the one or both of the first image and the first mark are positioned on a right side with respect to the driver's seat in the traveling direction, and the second case being a case where the moving body relevant to the one or both of the first image and the first mark are positioned on a left side with respect to the driver's seat in the traveling direction.

7. The display device for the vehicle according to claim 5, wherein one or both of an amount of a change in the display apparatus of the second image and an amount of the change in the display apparatus of the second mark in a first case are larger than an amount of the change in the display apparatus of the second image and an amount of the change in the display apparatus of the second mark in a second case, the first case being a case where the moving body relevant to the one or both of the first image and the first mark are positioned on a driver's seat side on which the driver's seat is disposed, and the second case being a case where the moving body relevant to the one or both of the first image and the first mark are positioned on a navigator's seat side opposite to the driver's-seat side.

8. The display device for the vehicle according to claim 1, wherein the one or more computers allow one or both of an amount of a change in the display apparatus of the second image and an amount of the change in the display apparatus of the second mark to differ between a first case and a second case, the first case being a case where the moving body relevant to the one or both of the first image and the first mark are positioned on a right side with respect to the driver's seat in the traveling direction, and the second case being a case where the moving body relevant to the one or both of the first image and the first mark are positioned on a left side with respect to the driver's seat in the traveling direction.

9. The display device for the vehicle according to claim 1, wherein one or both of an amount of a change in the display apparatus of the second image and an amount of the change in the display apparatus of the second mark in a first case are larger than an amount of the change in the display apparatus of the second image and an amount of the change in the display apparatus of the second mark in a second case, the first case being a case where the moving body relevant to the one or both of the first image and the first mark are positioned on a driver's seat side on which the driver's seat is disposed, and the second case being a case where the moving body relevant to the one or both of the first image and the first mark are positioned on a navigator's seat side opposite to the driver's-seat side.

10. The display device for the vehicle according to claim 1, wherein the one or more computers are further configured to:
   cause, upon detecting the moving body, the display apparatus to provide no display; and
   display, upon the prediction of the collision of the vehicle with the moving body, one or both of the first image and the first mark that correspond to the moving body on the display apparatus on which nothing has been displayed.

11. The display device for the vehicle according to claim 1, wherein the one or more computers are further configured to:
   determine whether the driver carries out one or more evasive operations for the collision that is predicted; and
   perform, responsive to determining that the driver does not carry out the one or more evasive operations, a third control of the display apparatus that causes the display apparatus to repeat displaying the one or both of the second image and the second mark.

12. The display device for the vehicle according to claim 1, wherein the one or more computers are further configured to:
   detect, when detecting the moving body, a side moving body positioning in the images at a left side or a right side of a course of a road on which the vehicle is traveling; and
   perform, only when detected the side moving body among the moving body, the first control of the display apparatus.

* * * * *